United States Patent [19]
Guild et al.
[11] 4,380,945
[45] Apr. 26, 1983

[54] PREADJUSTABLE WEB SLITTER AND NON-DEFLECTING MOUNTING THEREFOR

[75] Inventors: Gerald A. Guild, Dalton; Kenneth G. Frye, South Egremont, both of Mass.
[73] Assignee: Beloit Corporation, Beloit, Wis.

[21] Appl. No.: 228,261
[22] Filed: Jan. 26, 1981
[51] Int. Cl.$^{3}$ .............................................. B23D 19/06
[52] U.S. Cl. ........................................ 83/482; 83/498; 83/502; 83/503; 83/564
[58] Field of Search .................. 83/498, 499, 503-504, 83/528, 564, 482

[56] References Cited

U.S. PATENT DOCUMENTS

| | | | |
|---|---|---|---|
| Re. 20,492 | 8/1937 | Yoder | 83/499 X |
| 2,187,211 | 1/1940 | McKinley et al. | 83/482 |
| 3,185,010 | 5/1965 | Printz et al. | 83/501 X |
| 3,186,282 | 6/1965 | Waterhouse | 83/500 X |
| 3,202,029 | 8/1965 | Morath | 83/528 X |
| 3,380,330 | 4/1968 | Gilmore | 83/503 X |
| 3,545,326 | 12/1970 | Madachy | 83/503 X |
| 3,685,379 | 8/1972 | Frye et al. | 83/503 X |
| 3,892,156 | 7/1975 | Johnstone | 83/501 X |
| 3,956,957 | 5/1976 | Corse | 83/482 |
| 4,257,299 | 3/1981 | Aykut | 83/482 |

*Primary Examiner*—James M. Meister
*Attorney, Agent, or Firm*—Hill, Van Santen, Steadman, Chiara & Simpson

[57] ABSTRACT

Rigid support for adjustable slitter blade heads enables permanent factory setting of slitting overlap and the rake and toe-in angles. The upper blade is mounted on its blade head for both radial and axial movement relative to the lower blade without requiring resetting of the blade overlap and rake and toe-in angles. The blades are replaceable without requiring resetting of the blade cutting overlap and rake and toe-in angles. Full adjustment of the blade supporting heads across the web path is provided for. Setting efficiency is greatly improved.

23 Claims, 6 Drawing Figures

PREADJUSTABLE WEB SLITTER AND NON-DEFLECTING MOUNTING THEREFOR

This invention relates to web slitters, and is more particularly concerned with improvements in such slitters especially adapted for slitting running paper webs.

As is customary, web slitters comprise a lower slitter blade and an upper slitter blade which are supported on an adjustably movable mounting enabling the operator to relocate the entire assembly from side-to-side on the machine and to adjust the amount of overlap, i.e. depth of cut, the toe-in angle and the rake angle. Each time the slitter is relocated, it is necessary for the operator to check and adjust all of these settings.

The overlap adjustment has a substantial effect on the cut quality and the amount of dust produced at the slit line. Although the overlap setting is critical to cut quality, it is an adjustment that is difficult to make accurately by the machine operator. In practice the machine operator may employ a variety of overlap settings simply because he is unable to make the adjustment accurately.

Further, it has heretofore been deemed necessary to have the slitter blades set so that they overlap by about 0.050 to 0.060 inches, even though the quality of cut improves as this overlap distance is reduced. Heretofore, however, it has been deemed necessary to have the overlap of the extent just alluded to so that transient separating forces will not deflect the blade or mount to cause one blade to climb over the other.

Another problem that has been encountered in prior slitters involves the application of force or loading of the blades in axial direction toward one another. This force or load must be controlled accurately. Too little force will allow the web to force the blades apart and stop the cutting. Too great a force increases the tendency of one blade to climb on the other, and also increases the rate of blade wear.

A further problem encountered in prior slitters concerns the use of friction-type bearings for the side motion function. When an eccentric load, such as a side load at the perimeter of the blade is applied, the bearing tends to cock on its shaft and sliding friction is greatly increased. When small unavoidable amount of runout exists in either blade, the friction-type bearing binds, and the contact force between blades is greatly increased, thereby causing excessive blade wear.

All of the enumerated problems have substantially complicated web slitting and have been the cause of greater than desirable cost factor in the slitting process, especially aggravated in slitting of high bulk (thickness) webs.

An important object of the present invention is to overcome the disadvantages, drawbacks, inefficiencies, shortcomings and problems inherent in prior web slitters and to provide a new and improved slitter which will produce a high quality cut (minimize dust), substantially eliminate the need for operator adjustments, efficiently slit maximum bulk webs, and minimize blade wear.

Another object of the invention is to provide a web slitter having new and improved rigid mounting.

Still another object of the invention is to provide new and improved rotatable support for web slitters.

A further object of the invention is to provide new and improved adjustment means in web slitters.

A still further object of the invention is to provide new and improved blade loading means in web slitters.

The present invention provides a slitter comprising a lower blade carried rotatably by a lower blade head and an upper blade carried rotatably by an upper blade head, the blades being cooperative to slit a running web. Means support the heads adjustably relative to one another and transversely relative to the path of the running web and preferably comprise generally vertically spaced lower and upper rigid parallel head-supporting elongate rail means arranged to extend transversely relative to the web to be slit. Means mount the lower head on the lower rail means for rigid support thereby but adapt the lower head for adjustment along the length of the lower rail means and means mount the upper head on the upper rail means for rigid support thereby but adapt the upper head for adjustment along the length of the upper rail means and relative to the lower head. There are means for respectively releasably locking the heads in rigid adjusted positions along said rail means.

There may be means mounting one of the blades for movement relative to its carrying head for movement into and out of slitting cooperation with the other of the blades, means normally biasing the one blade out of the slitting cooperation, and means operative for overcoming the biasing means for selectively holding the one blade in slitting cooperation with the other blade.

Eccentric shaft means may mount one of the blades on its blade head, with means for actuating the eccentric shaft means rotatably for moving said one blade into and out of web slitting relation to the other of the blades.

Desirably means mount one of the blades on its blade head for movement relative to its blade head and relative to the other blade, fluid operated control means movably controlling the position of said one blade relative to the other blade.

Anti-friction bearing means are adapted for rotatably mounting at least one of the blades on the head carrying the same. Such anti-friction bearing means comprise respective annular anti-friction bearings axially spaced apart and located at respectively opposite sides of a plane through the edge of said one blade.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which.

Figure 1:
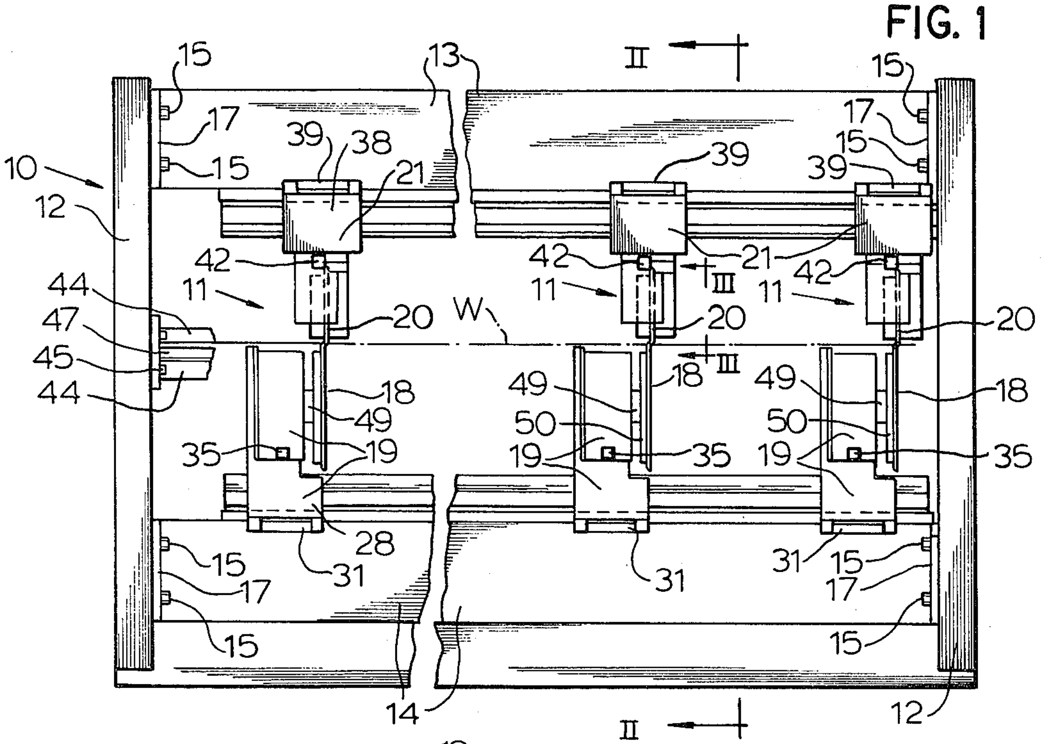
FIG. 1 is a fragmental front elevational view of a slitter embodying the invention.

By way of example (FIG. 1) a slitter installation 10 is depicted in which a plurality of slitters 11 is adjustably mounted to slit a web W of any desired initial width into a plurality of separate narrower lengths. In a paper web processing line, the slitter installation 10 may be conveniently located between a web source, such as a supply roll or between a calender downstream relative to a paper making machine, and a winder in which the slit separated lengths of the web are wound into respective rolls. As shown, the slitter installation 10 comprises a supporting frame having suitably spaced rigid uprights 12 which support between them vertically spaced upper and lower blade support cross beams 13 and 14, respectively, which may be secured fixedly to the uprights 12 as by means of bolts 15 securing respective attachment flanges 17 at the opposite ends of the beams 13 and 14 to the uprights 12. In a preferred construction, the cross beams 13 and 14 are of rigid hollow generally rectangular cross section and of a coextensive length to extend entirely across and slightly beyond the opposite edges of the web W.

Figure 2:
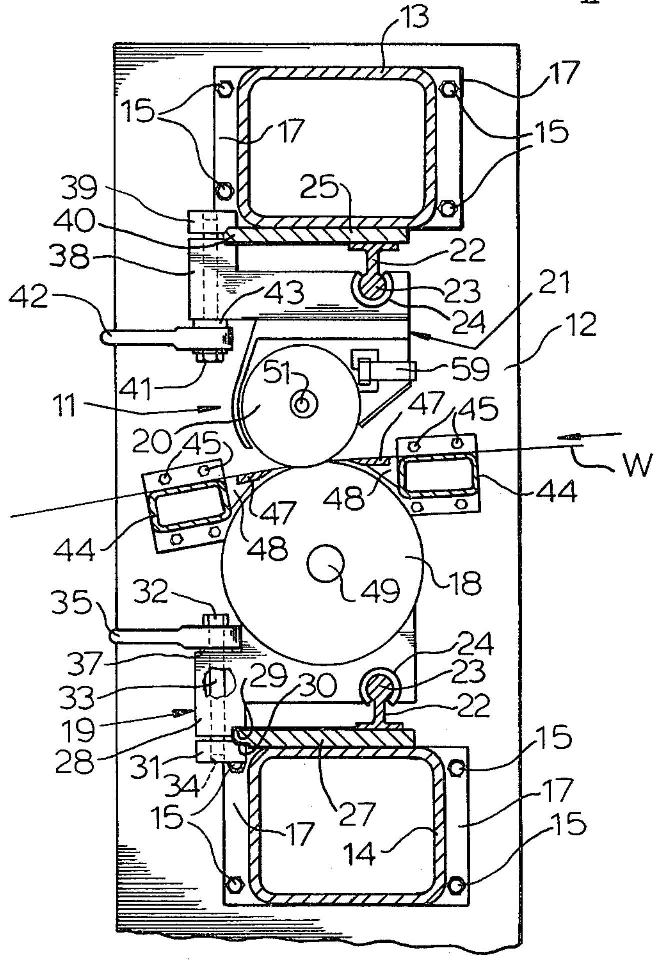
FIG. 2 is an enlarged fragmental vertical sectional detail view taken substantially along the line II—II of FIG. 1.

Each of the slitters 11 comprises a lower blade 18 carried rotatably by a lower blade head 19, and an upper blade 20 carried rotatably by a upper blade head 21. Each of the blade heads 19 and 21 is constructed and arranged to be mounted on its associated supporting beam 14 and 13, respectively, for ready selective adjustment along the length of the beam. For this purpose, each of the beams 13 and 14 has rigidly attached thereto a respective elongate rail 22 of a length to extend throughout the anticipated span along which the slitters 11 are expected to be supported adjustably. In a preferred form, each of the tracks 22 has a bulbar rail head 23 engaged slidably about more than 180° of the head perimeter by a complementary slotted tubular bearing bushing 24 on each of the heads 19 and 21. As best seen in FIG. 2, the rail 22 on the upper beam 13 projects downwardly from a rigid bed plate 25 to which the rail is secured as by means of welding and which plate is rigidly secured as by means of welding to the underside of the beam 13. To the same effect the lower rail 22 projects upwardly from the beam 14 and is secured as by means of welding to a bed plate 27 secured as by means of welding to the upper face of the beam 14.

Means are provided for fixedly but releasably locking each of the heads 19 and 21 in position on its supporting beam. For this purpose, the lower head 19 has a clamping foot 28 having a rabbet groove 29 within which is received the upper side of a forwardly projecting clamping lip 30 on the base plate 27. Similarly, a clamping block 31 engages the underside of the lip 30. Means for effecting clamping coaction of the clamping foot and block 31 comprise an elongate bolt 32 extending freely through a bore 33 in the foot 28 and having a distal end portion threadedly engaged in a tapped bolt hole 34 in the clamping block 31. A handle 35 fixedly secured to the head end portion of the bolt 32 extends radially from the bolt and is adapted to be manipulated for rotating the bolt for drawing the clamping block 31 toward the foot 28 and into clamping retaining engagement of the lip 30 by and between the clamping shoulders provided by the foot 28 and the block 31. A thrust washer 37 between the butt end of the handle 35 and the adjacent end of the foot 28 facilitates selective turning of the handle 35 into and out of clamp closing and clamp opening positions. Through this arrangement, the slitter head 19 is adapted to be infinitely incrementally adjusted along the length of the track 22.

To the same effect, infinitely incremental adjustment of the slitter head 21 is adapted to be effected along its track 22 by a similar clamping device comprising a foot 38 on the head 21 cooperating clampingly with a clamping block 39 to grip therebetween a clamp lip 40 projecting forwardly on the bed plate 25. A clamp bolt 41 extends freely through the foot 38 and has its distal end portion threadedly engaged in a complementary threaded bolt hole in the block 39. A handle 42 fixed to the head end of the bolt 41 is adapted to be manipulated for operating the bolt and has its butt end in engagement with a thrust washer 43. Through this arrangement, the upper blade head 21 is readily adjustable along its rail 22 relative to the lower head 19 in whatever adjusted position the lower head may be along its rail 22. Upon closing the clamp for the head 21 similarly as closing the clamp for the head 19, the head is locked positively and rigidly in the desired blade operating position, and the rigid rails will withstand great thrust forces or pressures that may be generated by and between the blades 18 and 20, without any detrimental yielding, but positively retain the blades 18 and 20 in their web slitting relationship.

For guiding the web W through the slitter station frame provided between the uprights 12 and between the beams 13 and 14, and in slitting plane through the slitters 11, supporting means are provided comprising flat topped web supporting bars 44 which extend parallel to the beams 13 and 14 from side to side between the uprights 12 and are secured to the uprights 12 as by means of attachment flanges attached to the uprights 12 by means of bolts 45. One of the web guiding bars 44 is located upstream in adjacent relation to the lower slitter blade 18 and another of the bars 44 is located downstream in adjacent clearance relation to the lower slitter blade 18. Respective supporting surface extension plates 47 are carried by the bars 44 on brackets 48 to close the gap between the tops of the bars and the slitting laps of the slitter blades 18 and 20. At their edges nearest the slitting laps, the plates 47 are chamfered for clearing the blade 18 but approach as close as practicable to the slitting laps of the blades.

Freely idling rotary mounting of the lower slitter blade 18 of each of the slitters 11 is desirably effected by means of a respective shaft 49 which may be rotatably supported by the head 19 and carries a backing disk 52 to which the blade 18 is secured in any desired manner.

Figure 3:
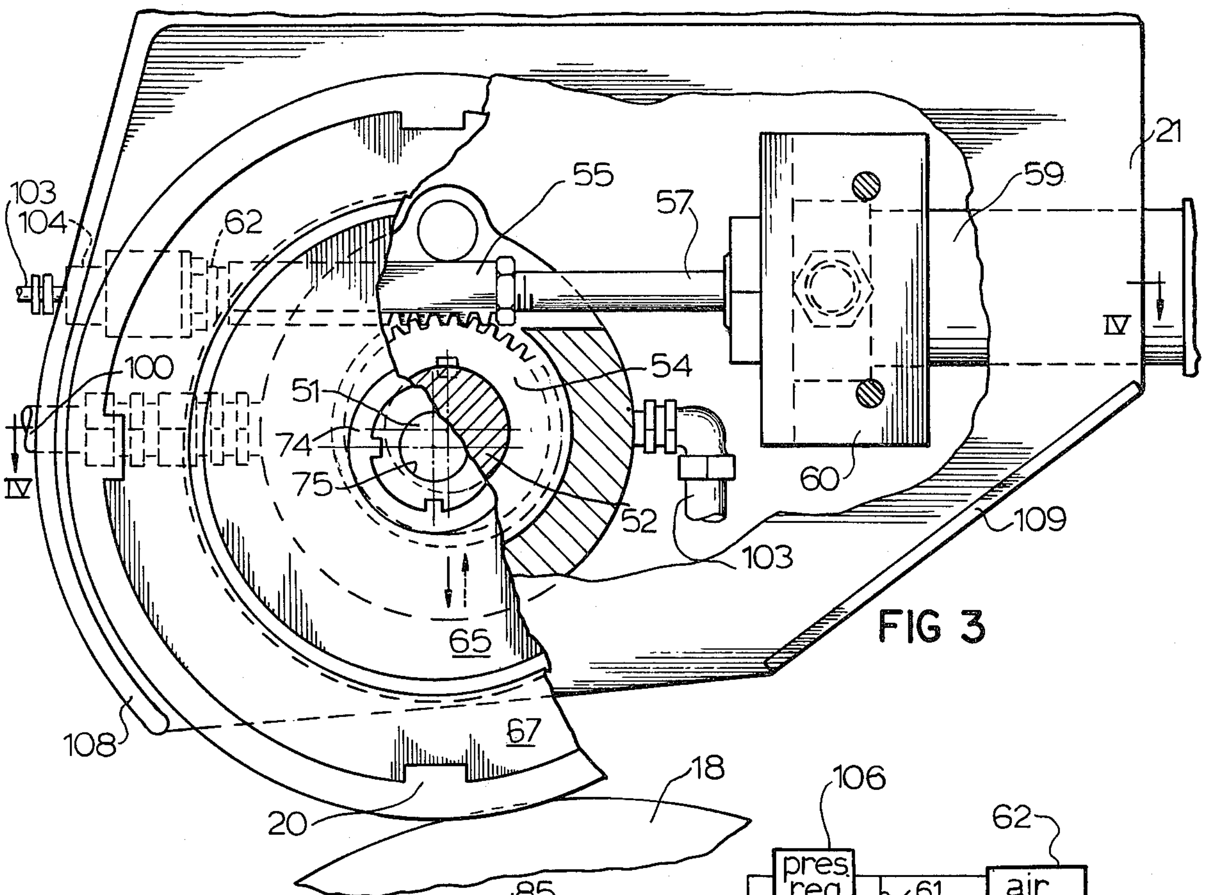
FIG. 3 is a substantially enlarged fragmentary elevational view, partially broken away and in section, taken substantially in the plane of line III—III of FIG. 1.

Means are provided enabling an optimum slitting cooperation of the slitter blades to be critically preadjusted at the factory during assembly of the units so that the blades will not require readjustment throughout the life of the unit. This includes overlap of the blades, where that is desired, toe-in angle and rake angle. Nevertheless, the blades are separable when necessary without losing the enumerated critical adjustments when the blades are brought back into slitting relationship. As indicated in FIG. 3, the upper slitter blade 20 is adapted to be lowered into slitting relation to the lower blade 18 as indicated by solid directional arrow and is adapted to be raised from the slitting relationship as indicated by the dash-line directional arrow. In addition, the blade 20 is adapted to be moved between a side loading slitting thrust relationship to the lower blade 18 as indicated by solid directional arrow in FIG. 4 and a backed off, separated relation to the lower blade 18 as indicated by dashed directional arrow. For raising and lowering the blade 20 it is rotatably mounted on an eccentric extension 51 of a supporting shaft 52 which is rotatably journaled in a linear rotary anti-friction bearing 53 carried by the head 21. At its end opposite the eccentric 51, the shaft 52 carries a pinion 54 fixedly keyed thereto, meshing with a rack 55 to which is connected a piston rod 57 extending from a piston 58 within an air cylinder 59 mounted at its base end to the head 21 as by means of an angular foot mount 60. In this instance the piston 57 is double acting in the cylinder 59. An air line 61 leads from an air source 62 through a control valve 63 and thence through one branch to the head end of the cylinder 59 and through another branch to the base end of the cylinder. By operating the control valve 63 to charge air into the head end of the cylinder, the piston 58 is driven toward the base end of the cylinder and thus in a direction to turn the shaft 52 for eccentrically shifting the blade 20 into slitting relation to the blade 18. When it is desired to raise the blade 20 into non-slitting clearance relation to the blade 18, the base end of the cylinder 59 is charged with compressed air from the compressed air source 62, under the control of the selectively operable control valve 63. Air pressure introduced into this cylinder 59 behind the piston 58 drives the piston toward the head end of the cylinder 59 and causes the reciprocable rack 55 to rotate the pinion 54 for turning the shaft 52 clockwise as seen in FIG. 3, whereby to lift the blade 20. By reversing the air pressure in the cylinder 59, the pinion 58 reverses and causes the rack 59 to turn the pinion 54 and thus the shaft 52 in the blade lowering direction, i.e. counterclockwise in FIG. 3.

The exact degree of overlap of the blade 20 relative to the blade 18, i.e. the depth of slitting cut, is accurately controlled by means on an end stop 64 engaged by the distal end of the rack member 55 under the thrust of the biasing piston 58. In other words, the blade overlap can thus be accurately preset and maintained throughout repeated raising and lowering of the blade 20 relative to blade 18.

By the arrangement just described, unusually narrow overlap settings of the blades 18 and 20 can be maintained with accuracy. Overlaps as low as 0.015 to 0.020 inch, or even no overlap for slitters operating on the principle of simply crushing the web fiber between the severing edges of the blades are practical by use of the present invention primarily because of the rigidity with which the slitter heads 19 and 21 are supported, the rigid beams 13 and 14 being located directly under and over the axes of the blades 18 and 19, and thus there is no chance for cantilever deflection as has been a problem with prior slitters. Accordingly, the critical adjustments in the functional cooperation of the slitter blades can be preset during manufacture of the slitters and need not be readjusted throughout the life of the unit.

Contributing further to the efficiency of the slitters 11 in each instance is the reduction in bearing load and reduction in rotational friction to a minimum provided by the rotary mounting of the slitter blade 20 on the spindle 51. To this end, the blade 20 is formed as a readily replaceable ring element provided with a suitable outer perimeter edge, such as a conventional beveled edge. The blade ring is mounted on and about a peripherally threaded hub 65 onto which is threadedly engaged a suitable lock nut 67 by which the blade is clampingly secured to an annular lateral flange 68 on the inner end of the hub, with just enough of the cutting edge portion of the blade 20 projecting beyond the perimeter of the flange 68 to attain adequate depth of cut. Removal of the blade 20 for sharpening or replacement is thus facilitated.

Anti-friction free rotary mounting of the hub 65 on the spindle 51 is effected in a manner to reduce bearing load and to reduce rotational friction to a minimum. For this purpose, respective sets of bearings 68*a* located adjacent to respectively opposite ends of a central bearing bore 69 in the hub 65 mount the hub. Although the bearings 68*a* may be roller bearings, another efficient form is ball bearings as shown in which the bearing balls are operative in radially inner and radially outer races. Respective inner and outer spacer bushings 70 and 71 extend between and maintain the inner and outer races of the bearings 68*a* spaced apart a desired distance within the bore 69 to position the bearings 68*a* at respectively opposite sides of a plane through the cutting edge of the blade 20. Fixed stops for the inner and outer races, respectively, of the inner of the bearings 68 are provided by a radially outwardly projecting annular shoulder flange 72 on the inner end of the spindle 51 and by a radially inwardly extending annular shoulder flange 73 on the hub 65 at the inner end of the bore 69. At the outer end of the bore 69, the inner race of the outer of the bearings 68 is thrust toward and against the inner spacer bushing 70 by a lock nut and washer assembly 74 secured about a threaded outer end portion 75 on the spindle 51. Means such as a snap-in lock ring 77 secures the outer race of the outer bearing 68*a* in thrusting engagement with the outer spacer bushing 71.

A new and improved side loading system for the slitter blade 20 is provided by fluid operated actuator means 78 (FIG. 4) by which the shaft 52 is adapted to be controlled for a limited range of reciprocal movement. Such reciprocal movement of the shaft 52 is facilitated by means of the linear rotary anti-friction bearing 53 which affords smooth movement of the shaft with no stick-slip condition and enables the unit to move freely to follow blade run-out and to maintain side loading very accurately as a function of applied fluid pressure, such as air pressure.

In a desirable construction, the actuator 78 comprises differential annular concentric fluid pressure chambers 79 and 80 defined between an annular housing part 81 secured fixedly but replaceably to the head 21 as by means of bolts 82, and a flanged tubular housing member 83 which is mounted by means of spaced bushing bearings 84 on and about a shoulder bolt 85 fixedly but releasably secured corotatively and coreciprocally on the inner end of the shaft 52 about which the pinion 54 is keyed. Between the housing portions 81 and 83, the differential pressure chambers 79 and 80 are enclosed between a common intermediate separating diaphragm 87, while the opposite side of the chamber 79 is closed by a diaphragm 88 and the opposite side of the chamber 80 is closed by a diaphragm 89. Differential volume of the chambers 79 and 80 is attained by an assembly of differential spacer rings comprising radially inner and radially outer rings 90 and 91, respectively, for the chamber 79 and radially inner and outer rings 92 and 93, respectively, for the chamber 80. The diaphragm 88 is clamped between radially spaced shoulders on the inner ends of the housing members 81 and 83 and the spacer rings 90 and 91. The diaphragm 87 is clamped between the spacer rings 90 and 91, and the spacer rings 93 and 94. The diaphragm 89 is clamped between the spacer rings 93 and 94 and a clamping ring 95 secured to the housing member 81 by the bolts 82, and a clamping ring 97 secured by a lock nut 98 threaded onto the outer end of the housing member 83. Through this arrangement, the stack of spacers and diaphragms is firmly secured in place on respectively the housing members 81 and 83.

Means are provided for constantly pressurizing the pressure chamber 79. To this end a pressure inlet port 99 leads to the chamber 79 and is supplied through a conduit 100 connected to compressed air source 62. Sufficient air leakage is provided for past the clamping spacer 91 to permit free passage of air from the part into the chamber 79. The pressure action in the chamber 79 functions to bias the blade carrying shaft 52 normally in the blade racking off or separating direction, that is in the direction of the dashed directional arrow in FIG. 4. A seal against leakage from the chamber 49 into the chamber 80 is effected as by means of O-ring 101. A check valve 101*a* holds biasing air pressure within the chamber 79 when the air source 62 is shut down.

To overcome the bias of the fluid pressure in the chamber 79 for loading the blade 20 into slitting cooperation with the blade 18, means are provided for selectively pressurizing the larger chamber 80 which is not only larger diametrically but also axially than the chamber 79. For this purpose, an inlet port 102 leads through the housing 81 into the chamber 80 and through clearance past the clamping ring 93, pressure fluid being supplied through a pressure line 103 connected with the pressure source 62 and controlled by a normally closed valve assembly 104 mounted on the head 21 through a foot bracket 105 in association with the stop 64. A valve actuator 107 projects from the stop 64 into the path of the distal end of the rack 55 acting as a plunger so that when the rack 55 is biased into the stop 64, the valve actuator 107 opens the valve 104 and thus opens the pressure line 103 to the source 62. As a result, the pressure chamber 80 is pressurized and the diaphragm 89 causes the shaft 52 to be biased in opposition to the pressure chamber 79, that is in the direction of the solid directional arrow in FIG. 4 and thereby loads the slitter blade 20 into slitting cooperation with the lower slitter blade 18. By means of a pressure regulator 106, the magnitude of the side loading force applied to the blade 20 may be substantially accurately maintained proportional to air pressure. It will thus be apparent that the cylinder 59 has the dual functions of controlling both the raising and lowering of the blade 20 through the rack and pinion mechanism, and the slitter loading of the blade 20 through the rack plunger and the valve 104.

It may be noted that the head 21 is provided with guard flanges 108 and 109 which project axially relative to and in spaced relation about the blade 20 and are of a width which is great enough to maintain a guarding relationship to the edge of the blade throughout its range of axial displacement, that is between the loaded position of the blade 20 relative to the blade 18 and the backed-off position of the blade 20.

Figure 4:
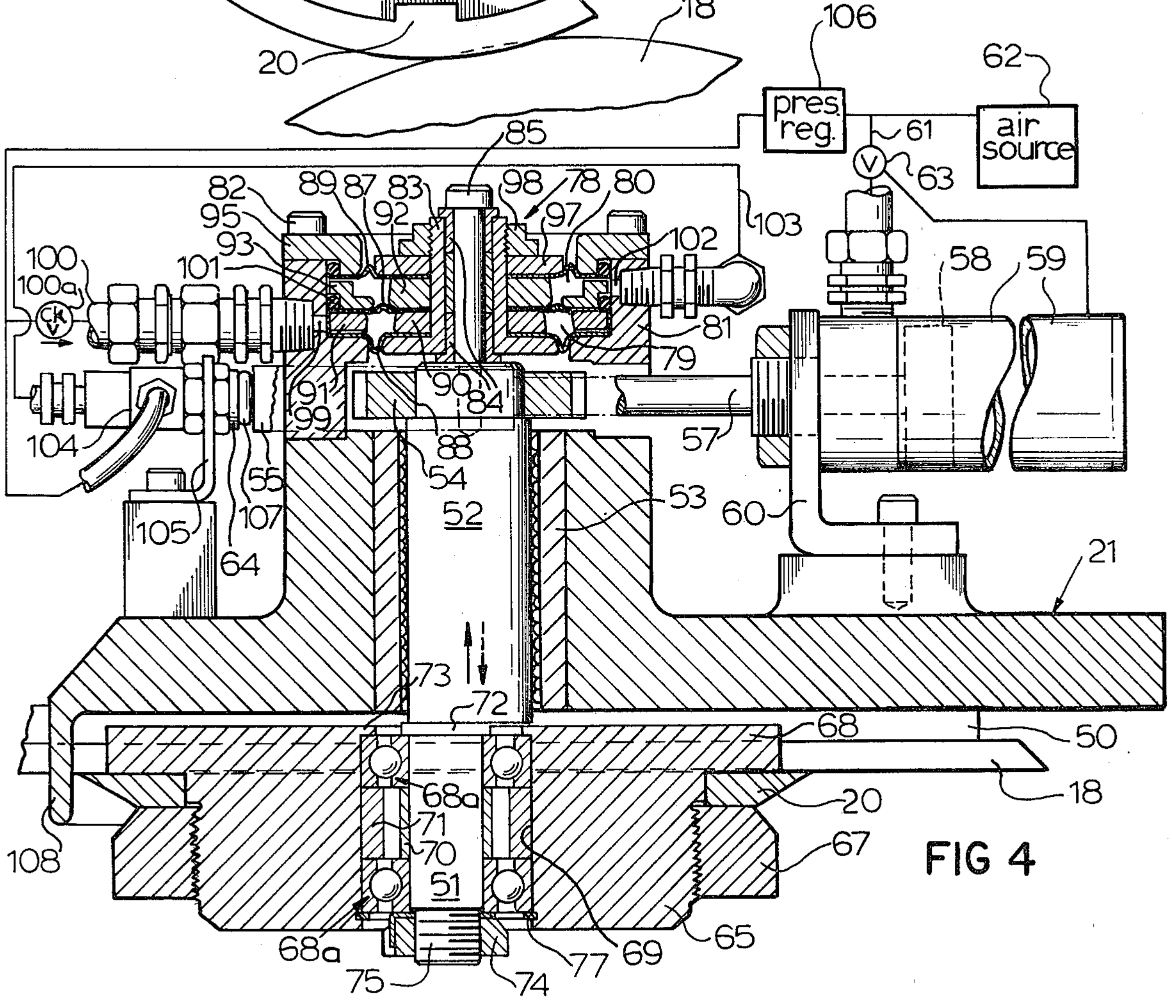
FIG. 4 is a sectional plan view taken substantially along the line IV—IV of FIG. 3.
Figure 5:
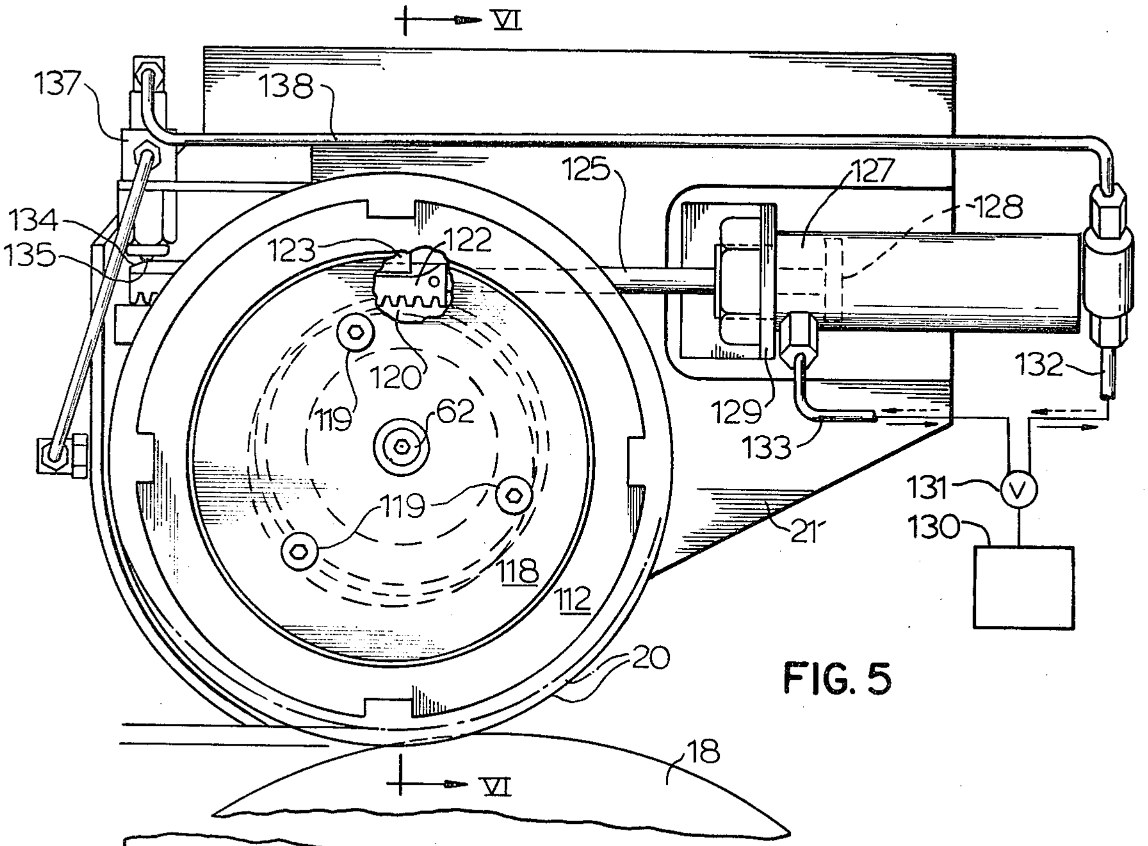
FIG. 5 is a fragmentary elevational view similar to FIG. 3 but showing a modification.
Figure 6:
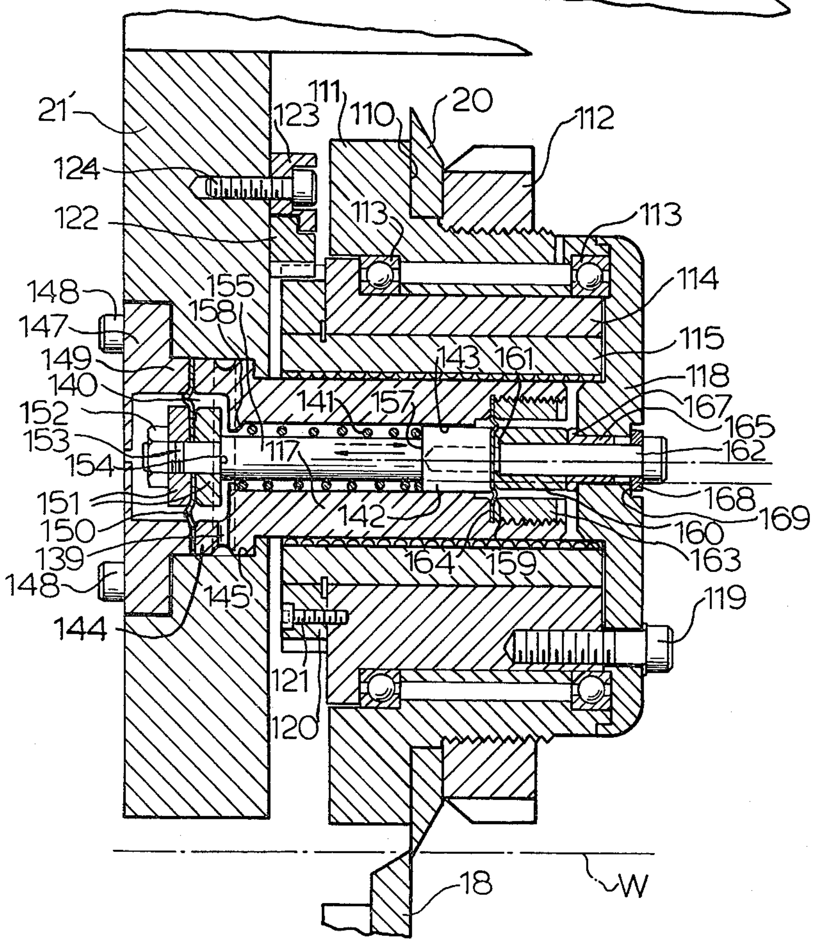
FIG. 6 is a sectional detail view taken substantially along the line VI—VI of FIG. 5.

In the modification of FIGS. 5 and 6, the general structural organization and relationships are generically substantially the same as in FIGS. 3 and 4, except that the mounting and control of the blade 20 on the head 21′ are specifically different. In FIGS. 5 and 6, the blade 20 is releasably secured to an axially facing shoulder 110 on a hub 111 by means of a lock nut 112 threadedly secured on the hub. Axially spaced anti-friction bearings 113 rotatably mount the hub 111 on and about an eccentric bushing 114 rotatably and axially movably mounted through a linear rotary anti-friction bearing 115 on a spindle shaft 117 which is secured fixedly to the head 21′. A cover plate 118 extends in retaining relation to the bearings 113 and is removably secured to the eccentric bushing 114 as by means of bolts 119.

Selective oscillatory rotation of the eccentric bushing 114 is adapted to be effected by means of a pinion 120 fixedly secured as by means of screws 121 to the inner end of the bushing 114 and in mesh with a rack bar 122 guided for reciprocal movement as by means of a guide rail 123 secured as by means of screws 124 to the head 21′. At one end, the rack 122 is attached to a piston rod 125 projecting from a double acting pressure fluid cylinder 127 having therein a piston 128 attached to the piston rod 125. Support for the cylinder 127 is provided by a foot bracket 129 carried by the head 21′. Pressure fluid such as compressed air supplied from a source 130 is controlled through a valve 131 to enter through a pressure line 132 into the cylinder 127 to act on the head end of the piston 128, while a pressure line 133 extends from the valve 131 to communicate through the cylinder 127 with the piston rod side of the piston 128. When the valve 131 is set to direct air into the piston head end of the cylinder 127, the rack 122 is driven towards the left as viewed in FIG. 5, whereby to operate the rack and pinion for moving the blade 20 into slitting relation with the blade 18 as shown in full outline in FIG. 5, whereas when the valve 131 is operated to direct air to the piston rod end of the piston 128, the rack and pinion are operated to rotate the eccentric bushing 114 to move the blade 120 upwardly as seen in FIG. 5 away from the blower blade 18, depicted in dash outline in FIG. 20.

Another important function of the cylinder and piston actuator 127, 128 is to control through the rack 122 serving as a plunger, automatic side loading of the blade 20 when it is in proper depth of cut slitting overlap with the lower blade 18. To this end, at the end of projection stroke, that is top blade lowering function, a cam surface 134 on the distal end portion of the rack bar plunger 122 engages and depresses a valve opening plunger 135 which opens a normally closed valve 137 interposed in a pressure fluid conduit 138 connected to the pressure fluid supply line 132 and leading through the valve 137 to an inlet 139 (FIG. 6) from which the pressure fluid is discharged into a pressure chamber 140 for overcoming the biasing effect of a coil compression spring 141 which normally acts to back the blade 20 axially away from the blade 18. As best seen in FIG. 6, both the chamber 140 and the biasing spring 141 are associated with a plunger 142 which is reciprocally slidably mounted in an axial bore 143 in the shaft 117 which is fixedly secured to the head 21′. A shouldered base 144 on the shaft 117 is secured fixedly in place in a complementary shouldered recess 145 in the head 21′ by means of a cover member 147 removably secured in place to the head member 21′ as by means of screws 148. The cover member 147 has an axially extending annular clamping portion 149 which clamps a flexible diaphragm 150 to the adjacent end of the shaft base 144. Attachment of the diaphragm 150 to the plunger 142 is effected by means of a pair of clamping washers 151 secured in place as by means of a lock nut 152 threaded on a reduced diameter portion 153 on the adjacent end of the plunger 142 and having at its base a shoulder 154 against which the clamping washers 151 are thrustingly tightened by the nut 152. In this instance, the inner of the washers 151 serves as a pressure responsive piston together with the diaphragm 150 which closes off the outer end of the chamber 140. A substantial pressure area differential is provided by the diaphragm 150 and piston compared to the diameter of a diaphragm 159 at the other end of the bore 143 so that when the chamber 140 is pressurized, the pressure fluid will drive the plunger 142 toward the left as viewed in FIG. 6 and as indicated by the full line directional arrow. Upon closing of the valve 137 the chamber 140 is depressurized, and the spring 141 drives the plunger 142 a limited distance toward the right as viewed in FIG. 6 and as indicated by the dashed directional arrow. A reduced diameter portion 155 on the plunger 142 accommodates the biasing spring 141 which at one end thrusts against a shoulder 157 on the plunger 142 and at its opposite end thrusts against a shoulder 158 on the shaft 117 adjacent to the chamber 140. Leakage past the full diameter portion of the plunger 142 is prevented by the diaphragm 159 acting as a closure and which is clamped against the end of the plunger by means of a thrust bushing 160 having an inturned annular flange 161 engaged by a shoulder screw 162 threadedly connected axially to the adjacent end of the plunger 142 against which the inner margin of the diaphragm 159 is thus clamped. At its outer margin, the diaphragm 159 is securely clamped by a ring nut 163 which clamps the diaphragm against an opposing axially facing shoulder 164 on the shaft 117. A bushing bearing 165 permits free rotation of the cover 118 about the bolt 162 and has a radially outwardly projecting annular coupling flange 167 which provides a thrust connection between the fixed bushing 160 on the bolt 162 and the cover 118. A thrust washer 168 between the head of the bolt 162 and a shoulder 169 on the cover 118 assures positive side loading thrust through the bolt to the cover and thus to the blade 20 when the pressure chamber 140 is pressurized.

In the arrangement of FIGS. 5 and 6, similarly as in the arrangement of FIGS. 3 ad 4, all of the blade setting parameters, i.e. blade lap or depth of cut, rake angle and toe-in are adapted to be permanently set at the time the head 21' is factory assembled, thus avoiding need for effecting such settings in the field, or even effecting readjustments or resettings. This is true even if the blade 20 needs to be replaced.

Further, in both embodiments automatic side loading of the upper slitter blade is effected when the appropriate valve, i.e. 104 or 137 is opened at the extreme or end of thrust of the rack plunger which effects the desired slitting cooperative relation of the blades.

It will be understood that variations and modifications may be effected without departing from the spirit and scope of the novel concepts of this invention.

I claim as my invention:

1. In a slitter comprising a lower blade carried rotatably by a lower blade head and an upper blade carried rotatably by an upper blade head, said blades being cooperative to slit a running web:

a supporting frame having generally vertically spaced lower and upper rigid parallel beams located, respectively, to underlie and overlie the web transversely in substantially spaced relation to the web, and each of said beams having a respective face which is directed toward the web; said lower beam having means on its said face for supporting said lower blade head under the web for selective adjustment longitudinally along the beam and transversely relative to said web;

said upper beam having means on its said face for supporting said upper blade head for selective adjustment longitudinally along said upper beam and transversely relative to the web;

at least one of said beams having a bed plate fixed to its said face and extending therealong for a distance substantially as long as the width of said web, and having a lip along its length projecting horizontally from one side of said one beam;

a rail fixed on said bed plate and projecting toward the web and extending throughout substantially the length of said bed plate;

the blade head supported by said one beam having means thereon engaging said rail for longitudinal adjustment movement along the rail; and said one beam blade head having a surface thereon engaging one side of said lip, a clamping element engaging the opposite side of said lip, and means for releasably drawing said clamping element and said one beam head toward one another and thereby effecting a clamping engagement of said lip between said head surface and said clamping element for maintaining said one beam blade head in selected adjusted position along said rail and said one beam and relative to the other of said blade heads.

2. A slitter according to claim 1, wherein each of said beams has on its face one of said bed plates and one of said rails, and each of said blade heads has said means engaging its associated bed plate rail and a respective said clamping surface and clamping element and means for drawing the clamping surface and clamping element toward one another for selectively clampingly gripping the associated bed plate lip.

3. A slitter according to claim 2, wherein said means for drawing the clamping element and blade head toward one another, for each of said blade heads, comprises a bolt having a handle at one end for turning the bolt, and said bolt having a shank extending through the clamping surface on the associated blade head and having its opposite end threaded into the associated clamping element, whereby to effect said releasable clamping by manipulation of the associated handle.

4. A slitter according to claim 2, wherein elongate shaft means carried by said upper blade head has the upper blade attached to one end of the shaft mean, means attached to the opposite end of the shaft means for selectively shifting the upper blade by means of said shaft means in an axial direction relative to the lower blade, means for raising and lowering said upper blade relative to said upper blade head and relative to the lower blade and comprising eccentric means about said shaft means and a pinion located intermediate said ends concentric with the fixed to said shaft means and a rack meshing with said pinion and extending on an axis normal to said shaft, and means for selectively driving said rack reciprocably to rotate said gear and thereby said shaft and effecting said raising and lower of said upper blade by operation of said eccentric means in the rotation of the shaft means.

5. A slitter according to claim 4, including means controlled by said rack for controlling operation of said means for shifting said upper blade axially.

6. A slitter according to claim 5, wherein said rack controlled means comprises a fluid pressure system provided with a valve having means operated by said rack for operating the valve, and a pressure fluid operated device effective by operation of the valve for effecting shifting of said upper blade.

7. A slitter according to claim 1, wherein one of said blade carrying heads has a hollow fixed shaft, an annular blade support rotatably mounted on and about said fixed shaft and carrying an annular slitter blade, a plunger extending through said hollow fixed shaft, one end of said plunger having means rotatably connected thereto and attached corotatively to said rotatable blade supporting means and adapted for axial reciprocation with said plunger, and means at the opposite end of said plunger for effecting selective reciprocations of the plunger for thereby shifting said blade in axial direction relative to said fixed shaft.

8. A slitter according to claim 7, wherein said means rotatably supporting said blade on said fixed shaft includes an eccentric device for effecting adjustment of said blade transversely relative to the axis of said fixed shaft, and means for operating said eccentric device.

9. A slitter according to claim 8, wherein said means for operating said eccentric device comprises a pinion attached to said eccentric device, and a rack meshing with said pinion and having means for selectively reciprocating the rack to turn said pinion and thereby effecting operation of said eccentric device.

10. In a slitter according to claim 1, wherein said rail has a bulbar cell head, and said one beam blade head has a complementary slotted tubular bearing bushing engaging the rail head for slidable adjustment along the rail head.

11. In a slitter having a lower blade carried rotatably by a lower blade head and an upper blade carried rotatably by an upper blade head, said blades being cooperative to slit a running web, means for supporting said heads adjustably relative to one another and transversely relative to the path of the running web, means mounting one of said blades for movement relative to its carrying head into and out of slitting cooperation with the other of said blades, means normally biasing said one blade out of said slitting cooperation, and means operative for overcoming said biasing means for selectively holding said one blade in slitting cooperation with said other blade, the improvement comprising:

- shaft means mounting said one blade on its associated blade head and having both of said biasing means and means operative for overcoming said biasing means located at one end portion of said shaft means and said one blade connected to the opposite end portion of said shaft means;
- eccentric means associated with said shaft means between said opposite end portions;
- a pinion connected with said eccentric means in a location between said opposite end portions;
- a rack meshing with said pinion and mounted for reciprocation relative to said pinion;
- and means for selectively actuating said rack for turning said pinion and thereby operating said eccentric means for effecting said movement of said one blade into and out of said slitting cooperation.

12. A slitter according to claim 11 wherein means for supporting at least one of said blade heads comprises a rigid beam mounted to extend across the running web, a bed plate fixed to said beam and facing toward the web, an edge portion of said plate providing a lip projecting from and along one side of said beam, a rail rigid with said base plate and running therealong spaced from said lip and projecting toward the web, said one blade head having tracking means engaging said rail for movement of said one blade head adjustably longitudinally along said rail, said one blade head having a clamping surface engaging the face of said lip which faces toward the web, a releasable clamping element engaging the opposite face of said lip, and means for effecting selectively clamping engagement of said element with said lip or release of the clamping element, whereby when the clamping element is released said one head can be adjusted longitudinally along said rail and when the clamping element is in said clamping engagement said one blade head will be held in selected position relative to the other of said blade heads.

13. A slitter according to claim 11, including means controlled by said rack for controlling operation of said means for overcoming said biasing means.

14. A slitter according to claim 13, wherein said rack controlled means comprises a fluid pressure system provided with a normally closed valve having means operated by said rack for opening the valve, and a pressure fluid operated device effective by opening of the valve for overcoming said biasing means.

15. A slitter according to claim 12, wherein said rail has a bulbar rail head, and said one blade head has a complementary slotted tubular bearing bushing engaging the rail head for slidable adjustment along the rail head.

16. In a slitter having a lower blade carried rotatably by a lower blade head and an upper blade carried rotatably by an upper blade head, said blades being cooperative to slit a running web, means for supporting said heads adjustably relative to one another and transversely relative to the path of the running web, means mounting one of said blades for movement relative to its carrying head into and out of slitting cooperation with the other of said blades, means normally biasing said one blade out of said slitting cooperation, and means operative for overcoming said means for selectively holding said one blade in slitting cooperation with said other blade, the improvement comprising:

- said mounting means comprising hollow shaft means fixed on one end to said one blade carrying head;
- tubular hub means extending rotatably about said fixed shaft means and thereby supporting said one blade for rotation about said fixed shaft means;
- plunger means mounted reciprocably in said fixed shaft means and having rotary means extending past the distal end of said fixed shaft means for connecting said plunger means with said tubular hub means;
- and means within the proximal end portion of said fixed shaft means and acting on the inner end portion of said plunger means for shifting the plunger means axially for effecting correponding axial movement of said rotary means and said tubular hub means and said one blade.

17. A slitter according to claim 16, including a tubular eccentric between said tubular hub means and said fixed shaft means, and means for rotatably turning said eccentric relative to said fixed shaft means for thereby shifting said tubular hub means and said one blade radially relative to said fixed shaft means.

18. A slitter according to claim 17, wherein said means for rotatably turning said tubular eccentric comprises a pinion attached to said eccentric means, a rack meshing with said pinion, and means for reciprocating said rack for turning said pinion and thereby turning said eccentric means for effecting said radial shifting of said tubular hub means and said one blade.

19. A slitter according to claim 18, including means controlled by said rack for controlling operation of said means operative for overcoming said biasing means.

20. A slitter according to claim 19, wherein said rack controlled means comprises a fluid pressure system provided with a valve having means operated by said rack for operating the valve and a pressure fluid operated device in said means operated for overcoming said biasing means.

21. A slitter according to claim 17, including means controlled by said rotatable turning means for controlling operation of said means for overcoming said biasing means.

22. In a slitter having a lower blade carried rotatably by a lower blade head and an upper blade carried rotatably by an upper blade head, said blades being cooperative to slit a running web, means mounting one of said blades on its blade head and including an eccentric, and means for actuating said eccentric rotatably for moving said one blade radially into and out of web slitting relation to the other of said blades, the improvement comprising: a pinion fixed to said eccentric, a reciprocable rack meshing with said pinion; actuator means for operating said rack, means normally active for biasing said shaft means and thereby said one blade in a blade separating direction, and means controlled by said rack for overcoming said biasing means for loading said one blade toward said other blade.

23. A slitter according to claim 22, wherein said rack controlled means comprises a fluid pressure system provided with a valve having means operated by said rack for controlling the valve, and a pressure fluid operated device effective by the controlling of said valve for shifting said shaft means and thereby loading said one blade toward said other blade.

* * * * *

UNITED STATES PATENT AND TRADEMARK OFFICE

CERTIFICATE OF CORRECTION

PATENT NO. : 4,380,945

DATED : April 26, 1983

INVENTOR(S) : Gerald A. Guild et al.

It is certified that error appears in the above-identified patent and that said Letters Patent is hereby corrected as shown below:

Column 10, line 50, "the" should read -- and --.

Signed and Sealed this

*Twentieth* Day of *September 1983*

[SEAL]

*Attest:*

GERALD J. MOSSINGHOFF

*Attesting Officer* *Commissioner of Patents and Trademarks*